Sept. 29, 1953     N. KAPLAN     2,653,345
FISH-SCALING CYLINDER CONSTRUCTION
Filed Dec. 27, 1950
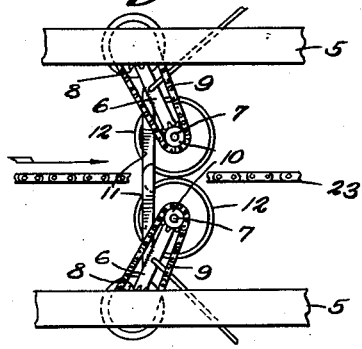
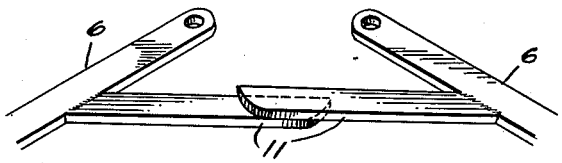
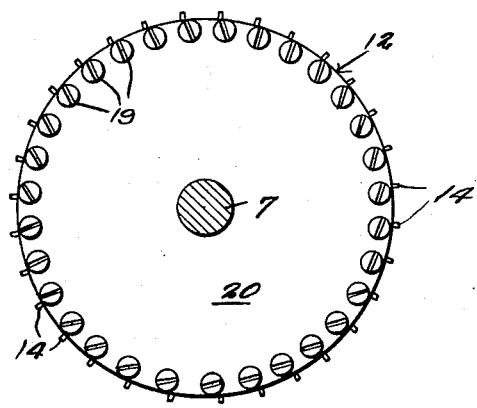
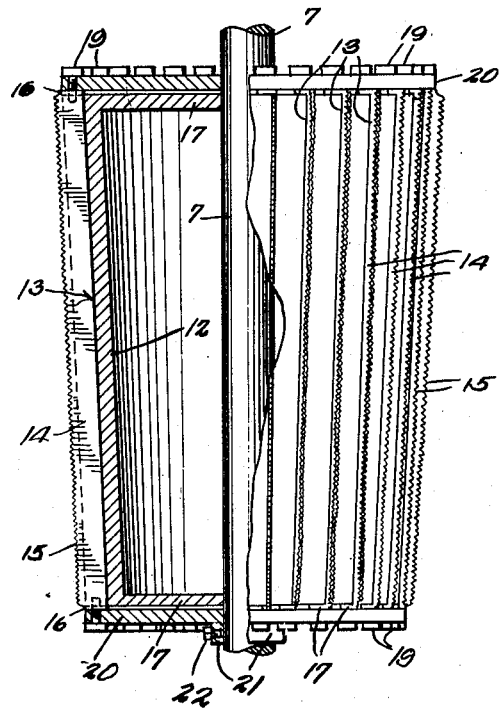
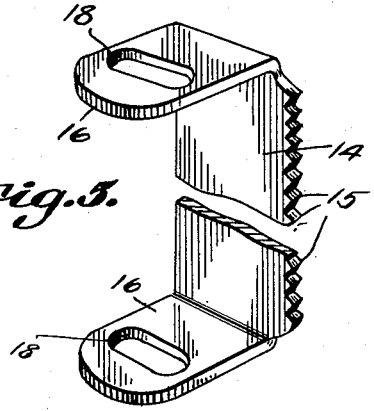
Nathan Kaplan
INVENTOR,
BY *CA Snow & Co.*
ATTORNEYS.

Patented Sept. 29, 1953

2,653,345

UNITED STATES PATENT OFFICE 2,653,345

FISH-SCALING CYLINDER CONSTRUCTION

Nathan Kaplan, Atlanta, Ga.

Application December 27, 1950, Serial No. 202,878

1 Claim. (Cl. 17—5)

This invention relates to fish scaling cylinders, and more particularly to fish scaling cylinders for use in fish scaling machines such as illustrated in my pending application Serial Number 740,335, filed April 9, 1947, now issued as Patent No. 2,589,701, March 18, 1952, the cylinder forming the subject matter of the present invention being designed for use in lieu of the brushes 42 forming a part of said pending application.

An important object of the invention is to provide a fish scaling cylinder embodying a plurality of adjustable scaling blades which are so arranged that the cylinder may be adjusted for use in scaling fish of various sizes.

Another important object of the invention is to provide a cylinder including a plurality of independent scaling blades having teeth formed along the outer edges thereof, the blades being so constructed and arranged with respect to the cylinder or support, that they may be individually adjusted, or removed for sharpening or replacement without the necessity of removing or changing the adjustment of the remaining blades of the cylinder.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing,

Figure 1 is a plan view illustrating fish scaling cylinders, constructed in accordance with the invention and illustrating contact arms to be engaged by arms carried by an endless conveyor and which conveyor arms operate to separate the cylinders at predetermined intervals.

Fig. 2 is a fragmental perspective view, illustrating the pivoted cylinder supporting arms and the separable arms that connect therewith.

Fig. 3 is an enlarged elevational view of one of the cylinders, portions thereof being shown in section to illustrate the interior construction of the cylinder.

Fig. 4 is a plan view of a cylinder.

Fig. 5 is a further enlarged perspective view illustrating one of the blades of the cylinder.

Referring to the drawing in detail, the reference character 5 indicates supporting bars of a fish scaling machine, the bars providing supports for the pivoted arms 6 which extend inwardly from the bars 5, the arms 6 having bearings at their outer ends in which the shafts 7 operate. At the pivoted ends of the arms 6, are sprockets 8 over which the belts 9 operate, the belts 9 also operating over the sprockets 10 that are secured to the shafts 7 so that rotary movement of the sprockets 8 may be transmitted to the shafts 7, through the belts and sprockets. As shown, the pivoted arms 6 are disposed at oblique angles with respect to the bars 5, and the arms 11 extend inwardly from the pivoted arms 6 with their inner ends overlapped, as shown by Fig. 1.

These shafts 7 support the fish scaling cylinders 12, which cylinders taper towards their lower ends. The cylinders are provided with vertical peripheral grooves 13 that extend throughout the lengths of the cylinders, in which grooves or slots the blades 14 are held, the blades 14 having teeth 15 formed in the outer edges thereof for contact with the fish scales to remove the scales as the fish are moved between adjacent fish scaling cylinders. As clearly shown by Fig. 5 of the drawing, the upper and lower ends of the blades 14 are extended laterally at right angles as at 16, the right angled ends resting on the ends 17 of the cylinders.

The right angled ends 16 are formed with transversely elongated openings 18 through which the securing screws 19 extend. Disposed on the upper and lower ends of the cylinders, are discs 20 which discs rest against the right angled ends 16 of the blades. These discs are also provided with openings that register with the elongated openings 18 and openings of the ends 17, between the slots of the cylinders, so that the blades may be readily secured in position. With this construction it will be seen that the blades may be readily and easily adjusted, and the individual blades may be removed for sharpening or replacement without the necessity of removing the entire set of blades of a cylinder.

As shown by Fig. 3 of the drawing, the lowermost disc 20 is provided with a collar 21 which is provided with a threaded opening, through which the bolt 22 extends, the bolt 22 resting against the shaft 7 to secure the cylinder to the shaft.

The reference character 23 indicates a chain which forms a part of the machine, and this chain is provided with means for clamping the fish and holding the fish in an upright position so that they may pass between adjacent cylinders for the proper scaling of the fish. The holding means, which are not shown in the present invention, are of metal construction, illustrated in my pending application, Serial Number 740,335, now issued as Patent No. 2,589,701, March 18, 1952, and on passing between the cylinders, the clamps engage the arms 11 forcing the arms inwardly with the result that the cylinders are swung laterally or separated so that the metal clamps will not engage the teeth of the blades to dull the teeth. With applicant's construction, it has been found that the fish which are passed through the machine will be readily and quickly scaled, but the scales will be preserved and the utility of the scales in the manufacture of buttons, artificial pearls or the like, will not be impaired.

Having thus described the invention, what is claimed is:

In a fish scaling machine, a scaling cylinder having threaded openings formed in the ends thereof, said cylinder having blade grooves extending longitudinally thereof, blades having teeth, disposed within said grooves, the teeth of said blades extending beyond the surface of the cylinder adapted to contact fish moving through the machine, removing scales therefrom, said blades having laterally extended right-angled ends formed with elongated openings, disposed transversely of said ends, said laterally extended ends resting on the ends of the cylinder, the openings of the cylinder registering with the openings of the laterally extended ends, discs positioned over the ends of the cylinder clamping the laterally extended ends of said blades against the ends of the cylinder, said discs also having openings aligning with the openings of the ends of the cylinder and laterally extended ends, and securing screws extending through the aligning openings and threaded in the openings in the cylinder ends, independently securing said blades in position on the cylinder.

NATHAN KAPLAN.

References Cited in the file of this patent

UNITED STATES PATENTS

| Number | Name | Date |
|---|---|---|
| 935,602 | Grub | Sept. 28, 1909 |
| 1,235,085 | Weinberg | July 31, 1917 |
| 2,345,607 | Kaplan | Apr. 4, 1944 |